(12) United States Patent
Daccord

(10) Patent No.: US 8,617,444 B2
(45) Date of Patent: Dec. 31, 2013

(54) METHOD FOR PREPARING CURVED FIBERS

(75) Inventor: Gérard Daccord, Vauhallan (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 510 days.

(21) Appl. No.: 12/890,969

(22) Filed: Sep. 27, 2010

(65) Prior Publication Data
US 2011/0082058 A1 Apr. 7, 2011

(30) Foreign Application Priority Data

Oct. 2, 2009 (EP) .................................... 09290762

(51) Int. Cl.
*B29C 53/60* (2006.01)
*B29C 53/32* (2006.01)

(52) U.S. Cl.
USPC ........... 264/281; 266/151; 266/163; 266/168; 266/339; 425/403

(58) Field of Classification Search
USPC ........................................................ 264/281
See application file for complete search history.

(56) References Cited

U.S. PATENT DOCUMENTS

| 3,431,337 A * | 3/1969 | Heimberger ................... 264/281 |
| 4,349,490 A * | 9/1982 | Bos ............................... 264/566 |
| 5,167,891 A * | 12/1992 | Dijkman et al. ............... 264/145 |
| 6,074,592 A * | 6/2000 | Shea ............................... 264/281 |
| 6,365,253 B1 * | 4/2002 | Primeau et al. ............... 428/36.9 |
| 7,192,541 B2 * | 3/2007 | Ardouin ........................ 264/1.29 |
| 7,841,850 B2 * | 11/2010 | Mottahedeh ................... 425/296 |

FOREIGN PATENT DOCUMENTS

| EP | 1284248 | 2/2003 |
| JP | 58145411 | 8/1983 |
| WO | 03042495 | 5/2003 |

OTHER PUBLICATIONS

Armstrong K. et al: "Advanced Fracturing Fluids Improve well economics" Oilfield review, vol. 7, n°3, pp. 34-51, XP009129739.
Abbas R. et al: "A safety Net for controlling lost circulation" Oilfield Review, vol. 15, n°4, 2003, pp. 20-27, XP009129740.
Bivins C. et al., "New fibers for hydraulic fracturing", Oilfield Review, vol. 17, n°2, 2005, pp. 34-43, XP009129741.
Daccord G. et al.: "Cement-Formation Interactions," in Nelson E.B. and Guillot D. (eds.): Well Cementing-2nd Edition, Houston: Schlumberger (2006): 191-232.

* cited by examiner

*Primary Examiner* — Benjamin Schiffman
(74) *Attorney, Agent, or Firm* — Michael Dae

(57) ABSTRACT

Equipment and methods for preparing curved fibers in a batch or continuous process. Fiber strands comprising a thermoplastic material are placed on a cylindrical surface and heated such that they soften and become malleable. The fiber strands assume the curvature of the cylindrical surface and, upon cooling below their softening temperature, retain the curvature. The curved-fiber strands are then cut to a desired length.

7 Claims, 2 Drawing Sheets

METHOD FOR PREPARING CURVED FIBERS

BACKGROUND

The statements in this section merely provide background information related to the present disclosure and may not constitute prior art.

Embodiments relate in general to equipment and methods for preparing curved fibers.

The inclusion of fibers in fluids for servicing subterranean wells has become a well-known practice. For example, fibers are added to drilling fluids to help minimize lost circulation. Similarly, fibers may be added to cement slurries to help minimize lost circulation; fibers can also improve flexural strength of set cement. In hydraulic fracturing operations, fibers may be added to proppant to help prevent proppant flowback as the well produces. Fibers are also used to improve the solids-carrying capacity of fluids as they are pumped downhole for various purposes.

A thorough presentation of the use of fibers in well-service fluids may be found in the following publications.

Armstrong K. et al.: "Advanced Fracturing Fluids Improve Well Economics," *Oilfield Review* 7, no. 3 (Autumn 1995): 34-51.

Abbas R. et al.: "A Safety Net for Controlling Lost Circulation," *Oilfield Review* 15, no. 4 (Winter 2003/2004): 20-27.

Bivins C. et al.: "New Fibers for Hydraulic Fracturing," *Oilfield Review* 17, no. 2 (Summer 2005): 34-43.

Daccord G. et al.: "Cement-Formation Interactions," in Nelson E. B. and Guillot D. (eds.): *Well Cementing—$2^{nd}$ Edition*, Houston: Schlumberger (2006): 191-232.

More recently, it has been discovered that fluids containing fibers (also known as fiber laden fluids) may be used as plugs that prevent the commingling of two other well-service fluids in a tubular body. For example, a fiber-laden fluid may be used to prevent contact between drilling fluid and a cement slurry—fluids that are often incompatible and would cause operational problems should they commingle.

Until now, fibers employed in well-service fluids have been linear; that is, the length of the fiber extends along a straight or nearly straight line. However, it has been discovered that curved fibers have utility in the domain of well-service fluids. This type of fibers is also documented in copending patent application n° EP09290761.7 to Services Petroliers Schlumberger.

In civil engineering, so-called "curved fibers", available, for example, from CNBM International Corporation, 5/F, Longbo Building, 3 Nanlishi Rd., Xicheng District, Beijing City, China, under the product name "Curved Polymer Fibre" are used for the reinforcement of concrete. However, such curved fibers are crimped or twisted in a helical pattern along their length. The bulk fiber shape is still linear, because the helix extends in a straight line.

The content of references cited above are incorporated herein.

It therefore remains desirable to have equipment and methods by which curved fibers may be prepared.

SUMMARY OF THE INVENTION

In a first aspect, the embodiments pertain to an apparatus for preparing curved fibers in batches. Views of a preferred embodiment of the apparatus are presented in FIGS. 1-3.

In a second aspect, some embodiments relate to an apparatus for preparing curved fibers continuously. A view of a preferred embodiment of the apparatus is presented in FIG. 4.

Also disclosed are batch methods for preparing curved fibers. The first aspect is employed to perform the method.

Also disclosed is a continuous method for preparing curved fibers. The second aspect is employed to perform the method. A cylindrical screw feeder is selected whose diameter between the threads provides a desired curvature. One or more continuous strands of fiber are also selected. Before operating the apparatus, it is first necessary to thread the fiber strands throughout the entire mechanism. In the rolling zone, the fiber strand passes through the opposing wheels and continues between the threads of the screw feeder until it reaches the unrolling zone, whereupon the fiber strands are guided off the screw feeder through opposing wheels and then fed into the cutting means.

The fibers suitable to be used have a workability-temperature range, defined herein as a temperature higher than the softening temperature (often the glass-transition temperature) of the fiber composition, and lower than the melting point of the fiber composition. For fiber compositions that do not melt, the upper limit is the decomposition temperature of the fiber composition. When heated to a temperature within the workability-temperature range, the fiber becomes malleable and assumes the curvature of the cylindrical surface. When cooled to a temperature below the softening temperature, the fiber is no longer malleable and therefore maintains the curvature.

Then, fiber diameters up to about 300 micrometers may be employed; however, diameters between 100 to 300 micrometers are preferred and diameters between 200 and 280 micrometers are even more preferred. The curved-fiber length after cutting may be between about 1 mm and 50 mm, more preferably between 5 mm to 20 mm and most preferably between 10 mm to 20 mm. The Feret length of the fibers, defined as the straight-line distance between each end of the curved fiber, may be between 5 mm and 30 mm. In addition, the curvature radius of the fibers may be between about 5 mm and 50 mm.

DETAILED DESCRIPTION

As mentioned earlier, the some embodiments relate to apparatuses and methods for manufacturing curved fibers that are especially suitable for well application. One application is the use of the present curved fibers in fluids employed during various operations performed during the construction and treatment of subterranean wells. Appropriate well-service fluids include (but are not limited to) drilling fluids, cement slurries, spacer fluids, chemical washes, completion fluids, acidizing fluids, fracturing fluids and gravel-pack fluids.

The fibers may comprise (but are not limited to) thermoplastic materials such as those in the following list: acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene, terephthalate, polycaprolactone, polychlorotrifluoroethylene, polyethylene terephthalate, polycyclohexone dimethylene terepthalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile. Of these, polyolefins, polyamides and polyesters are preferred.

Some suitable fibers have a "workability-temperature range", defined herein as a temperature range higher than the softening temperature (often the glass-transition temperature) of the fiber composition, and lower than the melting point of the fiber composition. For fiber compositions that do not melt, the upper limit is the decomposition temperature of the fiber composition. When heated to a temperature within the workability-temperature range, the fiber becomes malleable and assumes the curvature of the cylindrical surface. When cooled to a temperature below the softening temperature, the fiber is no longer malleable and therefore maintains the curvature.

Fibers with diameters up to about 300 micrometers; however, diameters between 100 to 300 micrometers are preferred and diameters between 200 and 280 micrometers are suitable. The curved-fiber length after cutting may be between about 1 mm and 50 mm, between 5 mm to 20 mm, and even between 10 mm to 20 mm. The Feret length of the fibers, defined as the straight-line distance between each end of the curved fiber, may be between 5 mm and 30 mm. In addition, the curvature radius of the fibers may be between about 5 mm and 50 mm.

Figure 1:
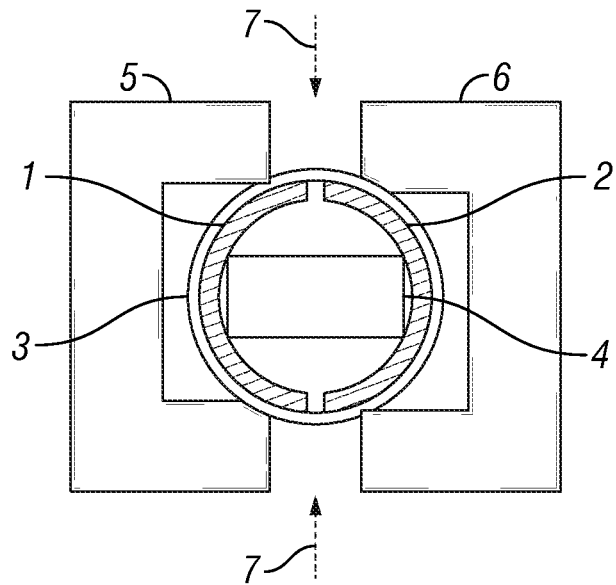
FIG. 1 is a cross-sectional view of an apparatus to prepare curved fibers in batches.
Figure 2:
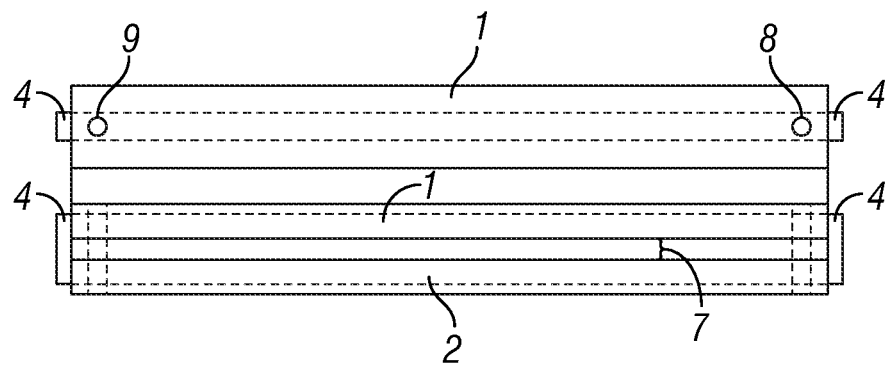
FIG. 2 shows how the half cylinders and spacing rod are arranged in the apparatus to prepare curved fibers in batches.
Figure 3A:
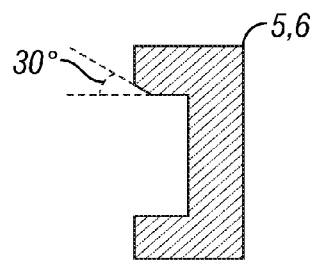
FIGS. 3A and 3B show views of an armature bracket employed in the apparatus to prepare curved fibers in batches.
Figure 3B:
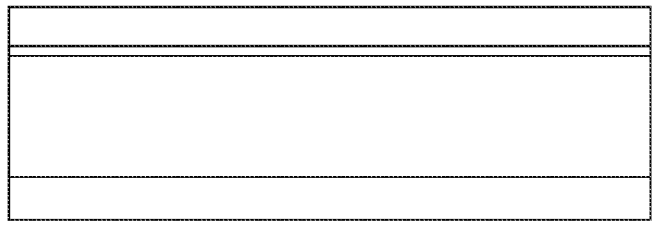

The first aspect is an apparatus for preparing curved fibers in batches. Views of one embodiment of the apparatus are presented in FIGS. 1-3. Curved bars 1 and 2 are arranged such that their concave surfaces face each other, but leave openings 7 between them. FIGS. 1-3 show two half-cylinders; however, it will be appreciated that more than two curved bars, each forming a curvature less than 90 degrees, may be also be used. Such an arrangement would create more openings. A spacing rod 4 is placed between the curved bars to maintain the openings, and hanging means are used to secure the curved bars to the spacing rod 4. In FIGS. 1-3 the hanging means are two bolts 8 and 9; however, it will be appreciated that other devices such as pins, clips and screws may also be appropriate. A strand of fiber 3 is wrapped around the curved bars in a manner such that the entire fiber surface is in direct contact with the curved-bar surfaces. In this way, the entire fiber strand is exposed to the same curvature. After the curved bars are wrapped with fiber, a supporting means surrounds the apparatus and holds the wrapped fiber in place. The supporting means shown in FIGS. 1-3 is an armature comprising two brackets 5 and 6. An internal portion of each bracket is notched such that the bracket surface is approximately tangent to the wound fiber, thereby minimizing damage. Although the angle shown in FIGS. 1-3 is 30°, it will be appreciated that angles between about 20° to about 50° would be appropriate. It will also be appreciated that the supporting means may comprise other devices such as tubes, triangular frames and the like. The effective external diameter of the half cylinders 1 and 2 is between about 5 mm and 20 mm. The width of the spacing rod 4 is between about 0.1 and 5 mm. The apparatus also comprises means for heating the fibers.

The description of the also encompasses a batch method for preparing curved fibers. The first aspect is employed to perform the batch method. Basically, a spacing rod 4 and curved bars 1 and 2 are chosen such that the combination provides a desired curvature and openings 7 between the curved bars. The spacing rod 4 is fixed to the curved bars 1 and 2 by hanging means 8 and 9.

A fiber strand 3 is selected. The fiber strand is wrapped around the curved bars 1 and 2 such that the entire strand is in direct contact with the curved-bar surfaces. In this way, all of the fiber is exposed to the same curvature. After wrapping, the supporting means 4 and 5 are placed over the assembly to hold the fiber strand in place.

Next, the apparatus is heated such that the fiber composition is heated to a temperature within its workability-temperature range. After heating, the apparatus is cooled such that the fiber temperature is restored to a temperature below the softening temperature. After cooling, the supporting means 4 and 5 are removed, and the wrapped fiber is cut along openings 7 between the curved bars. After cutting, the rest of the apparatus is disassembled, and the resultant curved fibers are collected.

Figure 4:
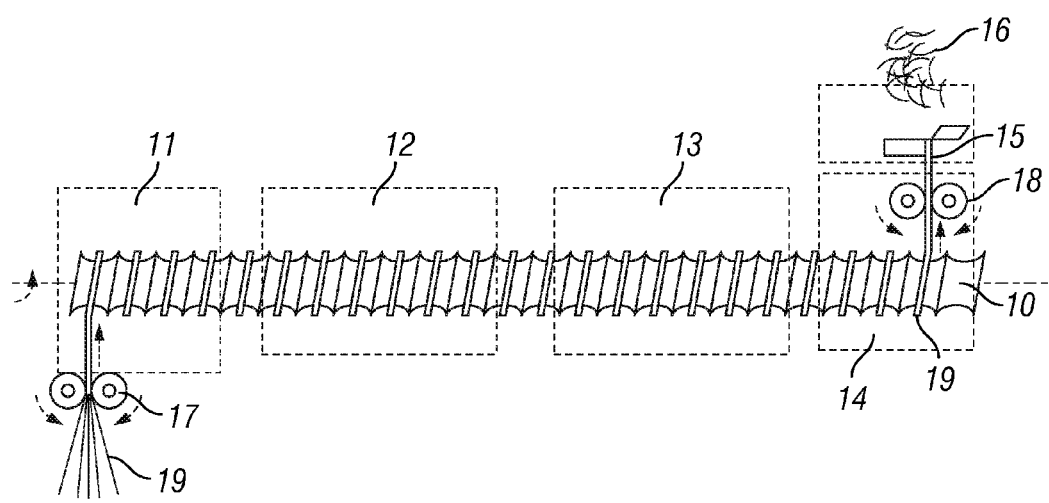
FIG. 4 is a diagram of an apparatus for preparing curved fibers continuously.

The second aspect is an apparatus for preparing curved fibers continuously. A view of one embodiment of the apparatus is presented in FIG. 4. One or more strands of fiber are guided onto a rotating cylindrical screw feeder 10 in a rolling zone 11. As shown in FIG. 4, the means for transporting and guiding the fiber strands to the screw feeder 10 comprises two opposing wheels or rollers 17 that rotate in opposite directions. Those skilled in the art will recognize that other means for transporting and guiding fiber strands may also be appropriate.

Rotation of the screw feeder 10 carries the fiber strands through a heating zone 12 and a cooling zone 13. An unrolling zone 14 at the end of the screw feeder 10 comprises means for guiding the fiber strands away. As pictured in FIG. 4, the means for transporting and guiding the fiber strands away from the screw feeder 10 comprises two opposing wheels or rollers 18 that rotate in opposite directions. Those skilled in the art will recognize that other means for transporting and guiding fiber strands may also be appropriate.

Next, the fiber strands encounter a cutting means 15 at which the fiber strands are chopped into desired lengths. After cutting, the curved fibers 16 are collected (not shown).

A continuous method for preparing curved fibers is also disclosed. The second aspect of the invention is employed to perform the continuous method. A cylindrical screw feeder 10 is selected whose diameter between the threads provides a desired curvature. One or more continuous strands of fiber 19 are also selected. For the purposes of this disclosure, a continuous strand is defined as having an extended length such as a spool containing many meters of continuous filament, thereby making the continuous method practical. Before operating the apparatus, it is first necessary to thread the fiber strands throughout the mechanism. In the rolling zone 11, the fiber strand 19 passes through the opposing wheels 17 and continues between the threads of the screw feeder until it reaches the unrolling zone 14, whereupon the fiber strands 19 are guided off the screw feeder through opposing wheels 18 and then fed into the cutting means 15.

Once the threading process is complete, rotation of the screw feeder 10 commences and a heat source is activated in the heating zone 12 such that the fiber composition reaches a temperature within its workability-temperature range. After becoming malleable and assuming the curvature of the screw feeder 10, the fiber strands 19 leave the heating zone and proceed to the cooling zone, in which the fiber-composition temperature falls below the softening temperature, and the fiber strands 19 lose their malleability. Next, the fiber strand 19 reaches the unrolling zone 14 and is guided away from screw feeder by opposing wheels 18, whereupon it reaches the cutting means 15 and is chopped into desired curved fiber lengths 16. The cut curved fibers 16 are then collected in a container (not shown).

The heating means in both the first and second aspects may be (but is not limited to) one or more members of the list comprising: an oven, a heating rod, a forced-air heater and an infrared heater.

As mentioned above, the curved fibers may be used as an additive in fluids employed during the construction and treatment of subterranean wells. It will be appreciated that the choice of thermoplastic material in the fibers would be dependent upon the temperature the fluid would encounter during the subterranean-well operation. One may choose a material with a workability-temperature range beginning at a temperature higher than that in the subterranean well.

The preceding description has been presented with reference to some embodiments. Persons skilled in the art and technology to which this invention pertains will appreciate that alterations and changes in the described structures and methods of operation can be practiced without meaningfully departing from the principle, and scope of the invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method of preparing curved fibers, using an apparatus comprising:
  i. at least two curved bars preferably having a curvature less than or equal to 90 degrees;
  ii. a spacing rod;
  iii. hanging means;
  iv. supporting means; and
  v. means for heating the apparatus,
  wherein the spacing rod being arranged in between the curved bars such that their concave surfaces face each other, but leave at least one opening between them;
  the supporting means fixes the curved bars to the spacing rod; and the supporting means surrounds and maintains the arrangement of the curved bars,
  the method comprising:
  i. selecting the spacing rod and curved bars, and arranging them such that they provide a desired curvature and gaps between the curved bars;
  ii. fixing the spacing rod to the curved bars with hanging means;
  iii. selecting a continuous fiber strand, the fiber having a composition with a workability-temperature range;
  iv. wrapping the fiber strand around the curved bars to form a fiber-wrapped assembly such that the entire strand is in direct contact with the curved-bar surfaces;
  v. securing the supporting means around the fiber-wrapped assembly;
  vi. heating the assembly such that the fiber composition is heated to a temperature within its workability-temperature range;
  vii. quenching the assembly such that it is restored to a temperature below a softening temperature of the fiber composition;
  viii. cutting the wrapped fiber along the openings between curved bars; and
  ix. disassembling the apparatus and collecting the resultant curved fibers.

2. The method of claim 1, wherein the fiber diameter is up to 300 micrometers.

3. The method of claim 1, wherein the curved-fiber length after cutting is between about 1 mm and 50 mm.

4. The method of claim 1, wherein a Feret length of the curved fibers after cutting is between about 5 mm and 30 mm.

5. The method of claim 1, wherein a curvature radius of the fibers after cutting is between about 5 mm and 50 mm.

6. The method of claim 1, wherein the fiber composition comprises a thermoplastic material.

7. The method of claim 1, wherein the fiber composition comprises one or more members of the list comprising: acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile.

* * * * *

UNITED STATES PATENT AND TRADEMARK OFFICE
CERTIFICATE OF CORRECTION

PATENT NO.        : 8,617,444 B2                      Page 1 of 1
APPLICATION NO.   : 12/890969
DATED             : December 31, 2013
INVENTOR(S)       : Gerard Daccord It is certified that error appears in the above-identified patent and that said Letters Patent is hereby corrected as shown below:

On the Title Page item (75), inventor's name should be corrected from "Gérard Daccord" to "Gerard Daccord".

Signed and Sealed this
Eleventh Day of February, 2014

Michelle K. Lee
*Deputy Director of the United States Patent and Trademark Office*